(12) United States Patent
Moser et al.

(10) Patent No.: US 8,590,803 B2
(45) Date of Patent: *Nov. 26, 2013

(54) THERMOSTATIC DEVICE AND RELATED METHOD

(75) Inventors: George G. Moser, Mason, MI (US); Gordon Sommer, Plymouth, MI (US); Adam Ostapowicz, Westland, MI (US)

(73) Assignee: Cooper-Standard Automotive, Inc., Novi, MI (US)

( * ) Notice: Subject to any disclaimer, the term of this patent is extended or adjusted under 35 U.S.C. 154(b) by 27 days.

This patent is subject to a terminal disclaimer.

(21) Appl. No.: 12/837,797

(22) Filed: Jul. 16, 2010

(65) Prior Publication Data

US 2010/0276613 A1 Nov. 4, 2010

Related U.S. Application Data

(63) Continuation of application No. 11/793,183, filed as application No. PCT/US2005/045392 on Dec. 14, 2005, now Pat. No. 7,757,962.

(60) Provisional application No. 60/637,085, filed on Dec. 20, 2004, provisional application No. 60/663,794, filed on Mar. 21, 2005, provisional application No. 60/690,672, filed on Jun. 16, 2005, provisional application No. 60/690,673, filed on Jun. 16, 2005.

(51) Int. Cl.
*G05D 23/02* (2006.01)
*F01P 9/00* (2006.01)

(52) U.S. Cl.
USPC ............. 236/93 R; 236/101 D; 123/41.1

(58) Field of Classification Search
USPC .......... 236/93 R, 101 D, 95, 74, 2 A; 251/11; 123/41.1; 137/625.33, 625.38
See application file for complete search history.

(56) References Cited

U.S. PATENT DOCUMENTS

| 1,468,689 A | 9/1923 | Ernst |
| 1,711,901 A | 5/1929 | Nelson |
| 1,798,431 A | 3/1931 | McWilliams |

(Continued)

FOREIGN PATENT DOCUMENTS

JP 2003213742 A * 7/2003

OTHER PUBLICATIONS

Supplemental European Search Report and Search Opinion regarding Application No. EP 05854162.4 (PCT/US2005045392) issued Sep. 2, 2012.

*Primary Examiner* — Chen Wen Jiang

(74) *Attorney, Agent, or Firm* — Harness, Dickey & Pierce, P.L.C.

(57) ABSTRACT

A thermostatic device for selectively opening and closing one of more apertures used for controlling the flow of a coolant fluid includes a housing, at least one fixed element and at least one moveable element. The at least one fixed element is fixedly interconnected to the housing. The at least one moveable is moveably connected to the housing. A fluid path passes through the fixed element and the moveable element. The fluid path is opened and closed in response to movement of the moveable element relative to the fixed element such that when the moveable element is in a first position the fluid path is closed and when the moveable element is in a second position the fluid path is open. A temperature responsive bi-metal element is coupled to the moveable element for moving the moveable element between the first position and the second position.

13 Claims, 16 Drawing Sheets

(56) References Cited

U.S. PATENT DOCUMENTS

| | | |
|---|---|---|
| 1,806,530 A | 5/1931 | Giesler |
| 2,177,937 A | 10/1939 | Goldschmidt |
| 2,902,262 A * | 9/1959 | Morse .......................... 165/300 |
| 5,110,045 A | 5/1992 | Glasson et al. |
| 5,217,085 A | 6/1993 | Barrie et al. |
| 5,692,675 A * | 12/1997 | Arlie .......................... 236/93 R |
| 7,757,962 B2 * | 7/2010 | Moser et al. ................ 236/93 R |

* cited by examiner

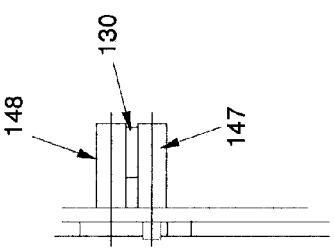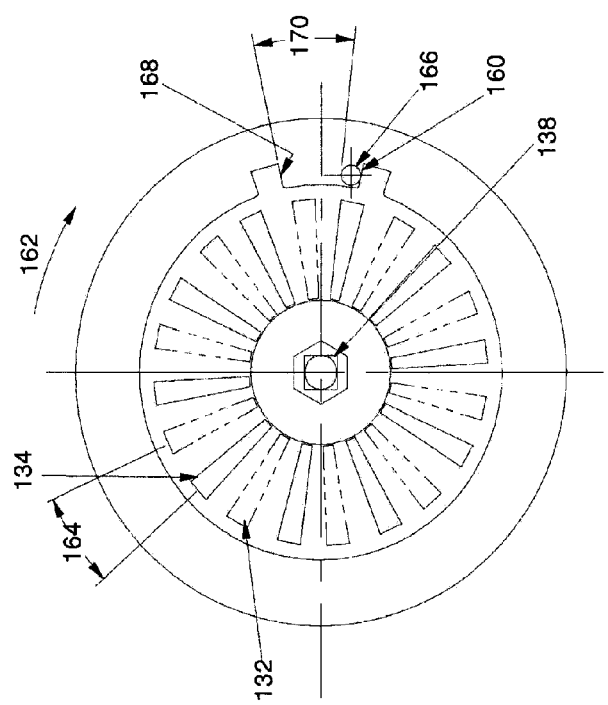

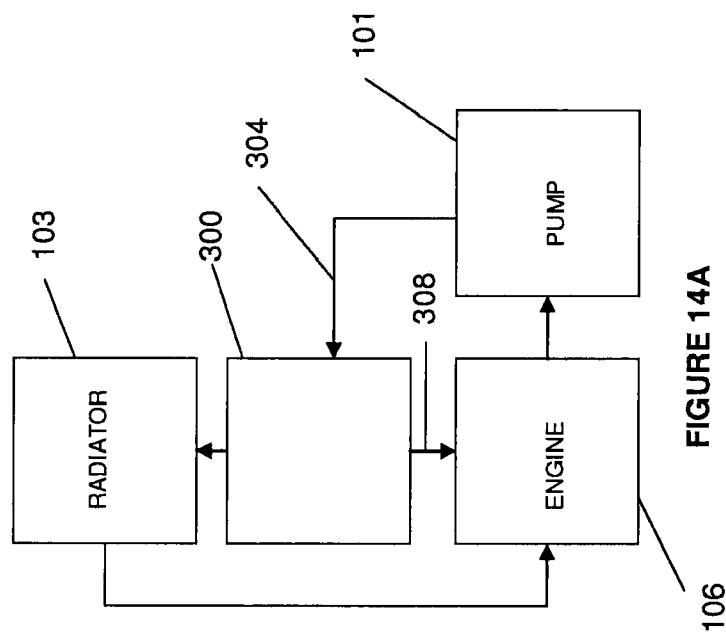
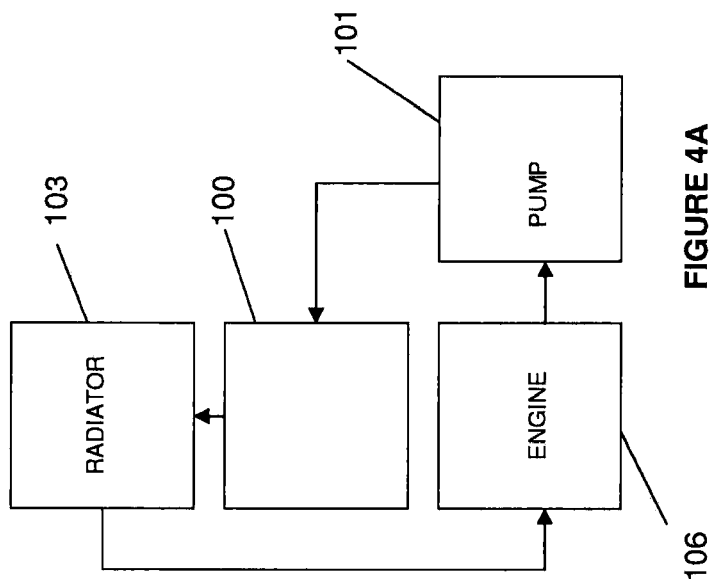

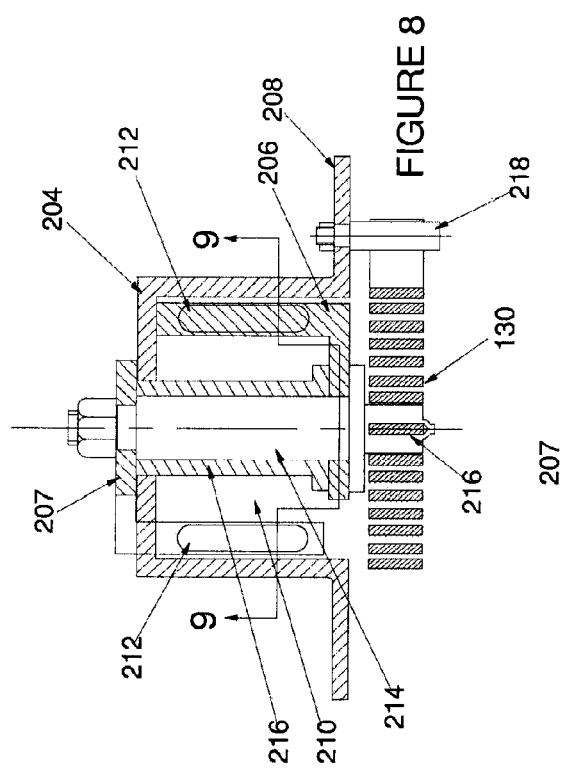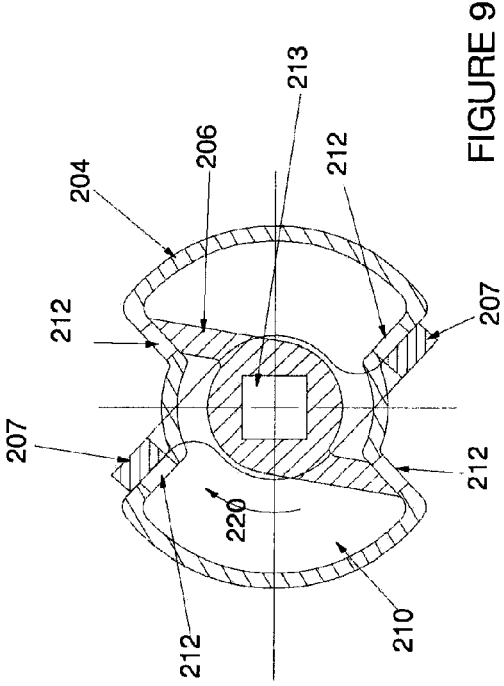

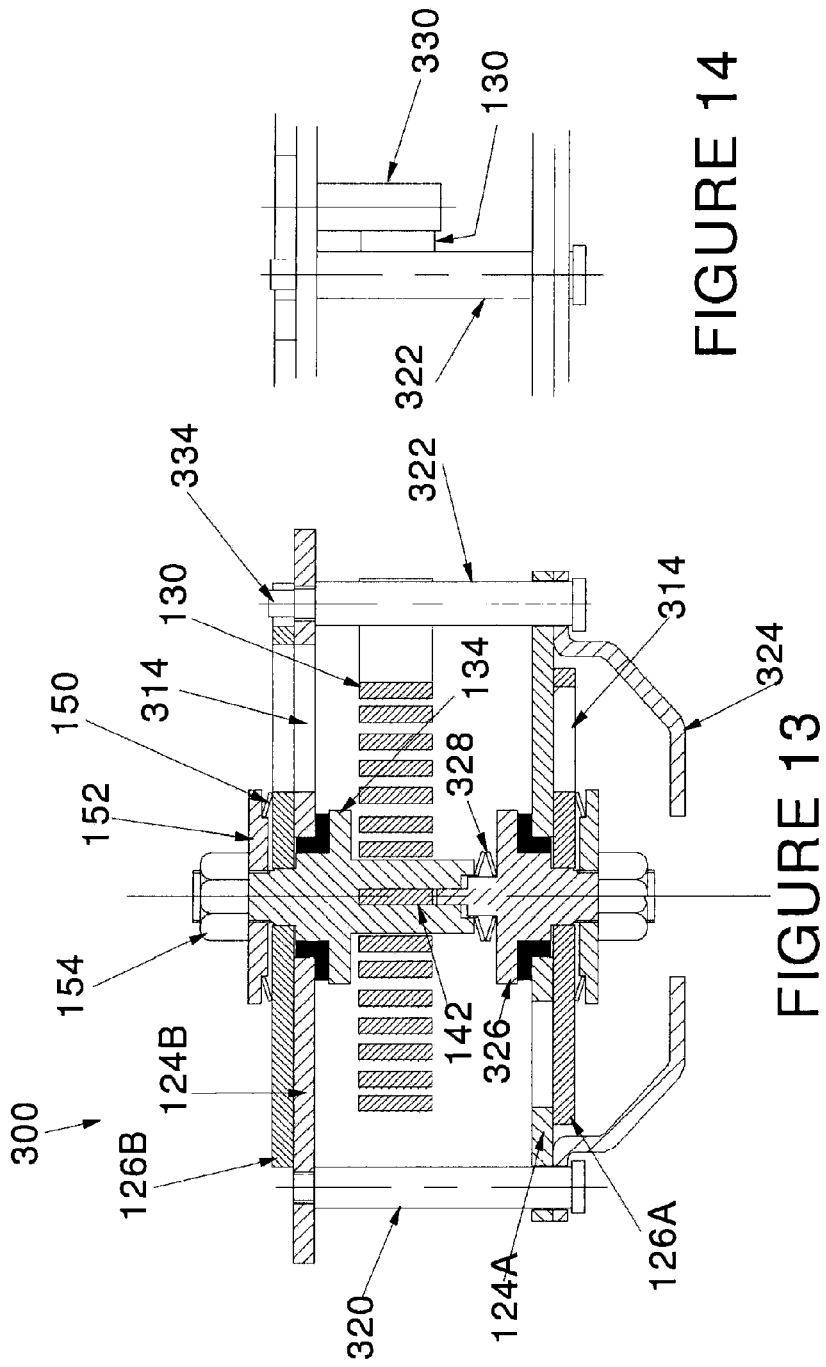

THERMOSTATIC DEVICE AND RELATED METHOD

CROSS-REFERENCE TO RELATED APPLICATIONS

This application is a continuation of U.S. patent application Ser. No. 11/793,183 filed Jun. 14, 2007, which is a 371 U.S. National Stage of International Application No. PCT/US2005/045392 filed Dec. 14, 2005 and published in English as WO 2006/068912 A1, which claims the benefit of U.S. Provisional Application Nos. 60/637,085 filed Dec. 20, 2004; 60/663,794 filed Mar. 21, 2005; 60/690,672 filed Jun. 16, 2005; and 60/690,673 filed Jun. 16, 2005. The disclosures of the above applications are incorporated herein by reference.

INTRODUCTION

The present teachings generally relate to thermostatic devices for controlling the flow of a fluid. More particularly, the present teachings relate to a thermostatic device for a vehicle engine cooling system.

Internal combustion engines have a coolant pump that is typically driven by a belt from the engine. The cooling pump circulates coolant through the engine to capture excess engine heat and then to a radiator to dissipate that heat into the atmosphere. When the engine temperature is relatively low there is no need to send coolant to the radiator. For instance, at engine startup it is desirable for the engine to warm up as quickly as possible and reach normal operating temperatures that optimize lubrication, minimize wear and reduce emissions. Sending coolant to the radiator while the engine is below optimum operating temperatures would prolong the warm-up period, which may be detrimental to the engine.

Conventionally, a thermostat is used to bypass the coolant back to the coolant pump. The thermostat is normally closed, preventing the coolant from reaching the radiator and forcing it instead to flow back to the pump through a bypass circuit. A conventional thermostat typically employs a wax actuator to open or close a poppet valve to accomplish this function. It is desirable that all coolant flow be bypassed until the engine has reached a pre-determined temperature level. The thermostat remains closed until this temperature level is reached. When the pre-determined temperature is reached, the wax in the wax actuator becomes liquid and expands inside the cylinder that contains it, pushing a piston that causes the valve seat to open by compressing the spring that biases the thermostat into a normally closed position. The thermostat opens and thereby allows the coolant to flow through the radiator.

The main weakness of conventional wax thermostats relates to a propensity to leak. The wax contained in the thermostat cylinder becomes liquid and expands when the temperature rises, exerting substantial pressure against the moveable piston. Over time this can cause failure of its sealing mechanism and leaking of the thermostatic wax, which renders the thermostat non-operational. A leaky thermostat will eventually stop working and will not open, which can cause overheating of the engine and potentially engine destruction. Thermostat failure is a relatively common, well-known occurrence that is well known to most automobile owners.

It remains a need in the pertinent art to address the limitations of known thermostats including, but not limited to, those limitations discussed above.

SUMMARY

The present teachings are directed to a thermostatic device having a solid bi-metal element to effect opening and closing of a fluid path.

In one aspect, the present teachings provide a thermostatic device having a bi-metal element that opens multiple apertures at a predetermined temperature to allow coolant to flow through the radiator.

In another aspect, the present teachings provide a thermostatic device for selectively opening and closing one of more apertures used for controlling the flow of a coolant fluid. The thermostatic device may include a housing, at least one fixed element and at least one moveable element. The at least one fixed element may be fixedly interconnected to the housing. The at least one moveable may be moveably connected to the housing. A fluid path passes through the fixed element. The fluid path is opened and closed in response to movement of the moveable element relative to the fixed element such that when the moveable element is in a first position the fluid path is closed and when the moveable element is in a second position the fluid path is open. A temperature responsive bi-metal element may be coupled to the moveable element for moving the moveable element between the first position and the second position.

In yet another aspect, the present invention provides a thermostatic assembly for selectively opening and closing a fluid path to control the flow of a coolant fluid. The thermostatic assembly can include a housing, a fixed element, and first and second moveable elements. The fixed element can be fixedly interconnected to the housing. The fixed element may be disposed in the fluid path and define a plurality of openings through which the fluid path extends. The first moveable element can be moveably connected to one of the housing and the fixed element for selectively opening and closing at least a first opening of the plurality of openings in the fixed element from a first side of the fixed element. The second moveable element can be moveably connected to one of the housing and the fixed element for selectively opening and closing at least a second opening of the plurality of openings in the fixed element from a second side of the fixed element. The assembly can include a temperature responsive element coupled to the first and second moveable elements for moving the first and second moveable elements between closed and opened positions in response to a change in fluid temperature. Below a predetermined fluid temperature, the first and second moveable elements can be in closed positions in which fluid is prevented from flowing through the corresponding openings in the fixed member. Above a predetermined temperature, the first and second moveable members can be in open positions in which fluid is allowed to flow through the corresponding openings in the fixed member.

In still yet another aspect, the present teachings provide a thermostatic assembly in combination with a bypass for controlling the flow of an engine coolant fluid. The thermostatic assembly includes a first pair of cooperating elements for selectively establishing a first fluid path and a second pair of cooperating elements for selectively establishing a second fluid path. The first fluid path extends between an engine and a radiator. The second fluid path is a bypass for routing coolant fluid back to the engine without going through the radiator. The assembly further includes a temperature responsive element coupled to the first and second pairs of cooperating elements for selectively establishing the first and second fluid paths in response to a change in fluid temperatures. Below a predetermined fluid temperature, the first fluid path is closed and the second fluid path is open. Above the predetermined fluid temperature, the first fluid path is open and the second fluid path is closed.

Further areas of applicability of the present teachings will become apparent from the detailed description provided hereinafter. It should be understood that the detailed description and specific examples are intended for purposes of illustration only and are not intended to limit the scope of the teachings.

BRIEF DESCRIPTION OF THE DRAWINGS

The present teachings will become more fully understood from the detailed description and the accompanying drawings, wherein:

FIG. 3 is a plan view of the thermostatic device of FIG. 1 taken in the direction of arrow A of FIG. 2.

FIG. 4 illustrated the anchoring of a bi-metal coil of the thermostatic device of FIG. 1.

FIG. 4A is a schematic illustration showing the flow of coolant fluid between the thermostatic device of FIG. 1 and the radiator, engine, and coolant pump.

FIG. 8 is an enlarged cross-sectional view further illustrating the thermostatic device of FIG. 7.

FIG. 9 is a cross-sectional taken along the line 9-9 of FIG. 8.

FIG. 13 a further enlarged cross-sectional view illustrating the thermostatic device of FIG. 10.

FIG. 14 illustrates anchoring of the bi-metal spiral of the thermostatic device of FIG. 10.

FIG. 14A is a schematic illustration showing the flow of coolant fluid between the thermostatic device of FIG. 1 and the radiator, engine, and coolant pump.

DESCRIPTION OF VARIOUS ASPECTS

Figure 1:
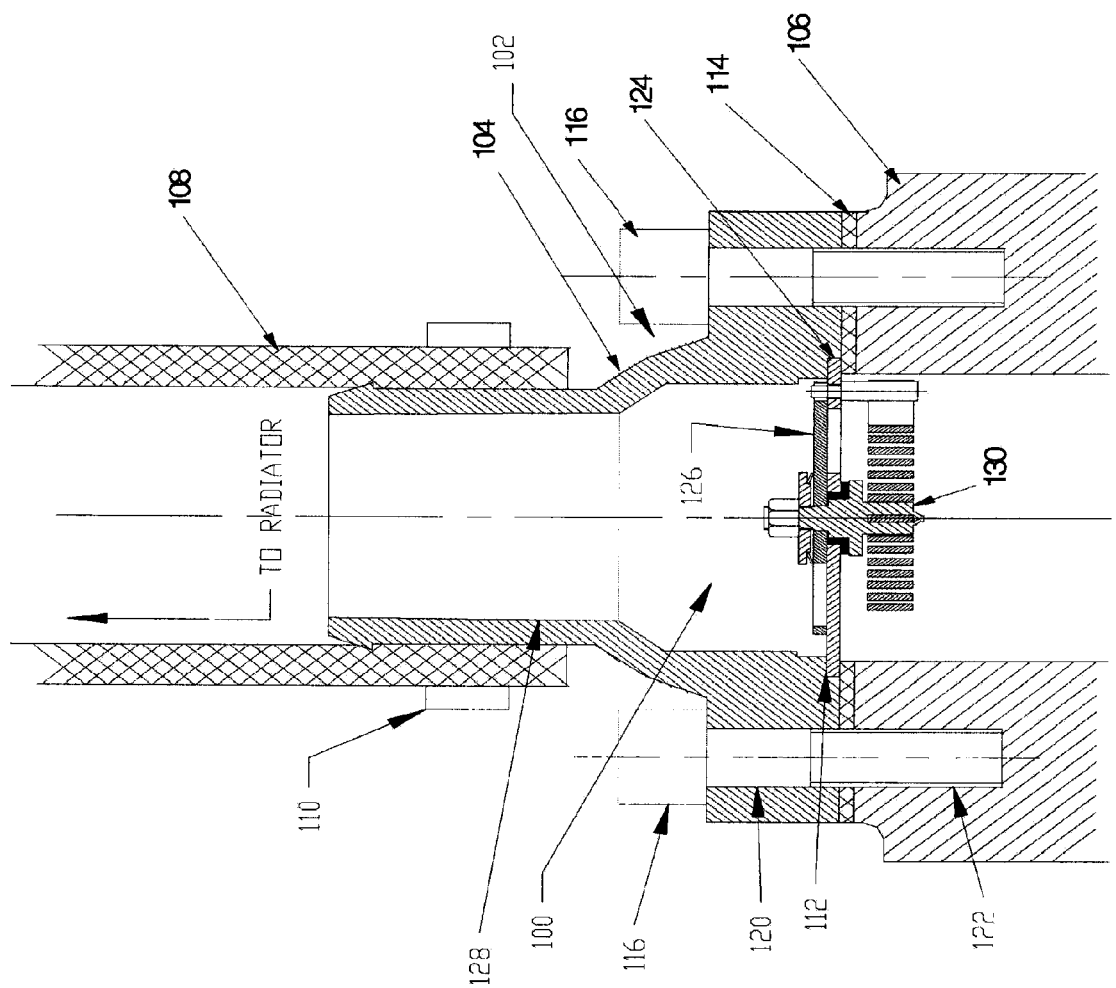
FIG. 1 is a cross-sectional view illustrating a thermostatic device in accordance with the present teachings, the thermostatic device shown operatively mounted to an engine.
Figure 2:
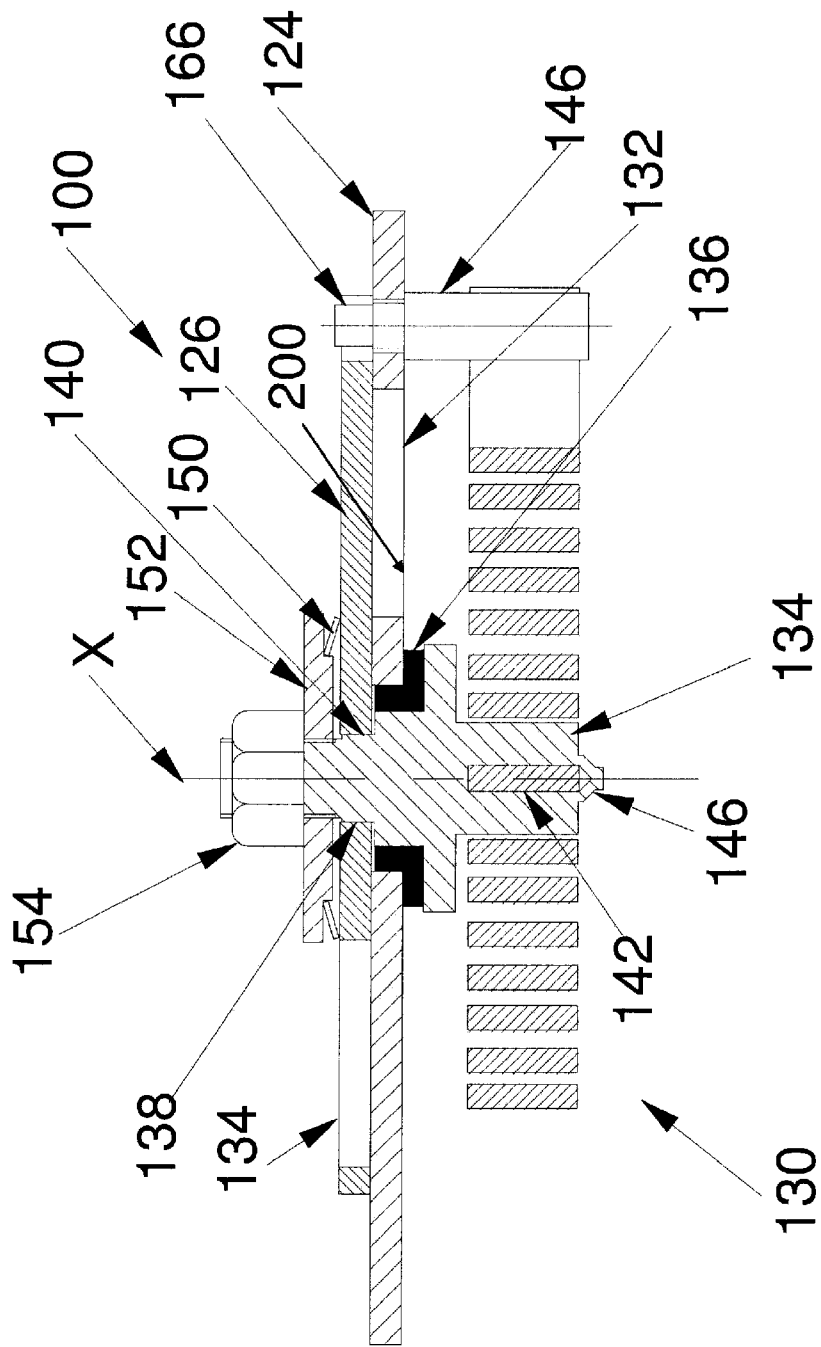
FIG. 2 is an enlarged cross-sectional view further illustrating the thermostatic device of FIG. 1.

The following description is merely exemplary in nature and is in no way intended to limit the teachings, its application, or uses.

With initial reference to FIGS. 1 through 4 and 4A, an aspect of a thermostatic device constructed in accordance with the present teachings is illustrated and identified at reference character 100. In one application, the thermostatic device 100 is operative for selectively operative for routing an engine coolant fluid from a vehicle engine 106 via a coolant pump 101 to a radiator 103. The radiator 103 and pump 101 are schematically illustrated in FIG. 4A.

The thermostatic device 100 is shown incorporated into a thermostatic assembly 102 having a housing 104. The housing 104 is shown operatively positioned between a vehicle engine 106 and a radiator hose 108. The hose 108 may be attached to the housing 104 in any manner known in the art. For example, the hose 108 may be attached to the housing 104 with a hose clamp 110. The hose 108 carries coolant to the radiator. Insofar as the present teachings are concerned, the engine 106 and hose 108 will be understood to be conventional in construction and operation. To the extent not described herein, the housing 104 of the thermostatic assembly 102 will also be understood to be conventional in construction and operation.

The thermostatic device 100 may be located within a counter bore 112 defined by the housing 104. A gasket 114 may be placed between the engine 106 and housing 104. The housing 104 may be conventionally secured to the engine 106. As illustrated, the housing 104 may be secured to the engine 106 by screws 116 which pass through apertures 120 defined by the housing 104 and threadably engage apertures 122 defined by the engine 106.

The thermostatic device 100 may include a fixed or stationary element 124 and a moveable element 126. A fluid path 128 passes through the fixed element 124. The fluid path 128 extends between the engine 106 and the radiator for transferring a source of coolant. As will be discussed more fully below, the fluid path 128 may be opened and closed in response to movement of the moveable element 126 relative to the fixed element 124. The fixed and moveable elements 124 and 126 define a first pair of cooperating elements for selectively establishing the fluid path 128. In this regard, when the moveable element 126 is in a first position relative to the fixed element 124, the fluid path 128 is closed. When the moveable element 126 is in a second position relative to the fixed element 124, the fluid path 128 is open. It will be understood that when the fluid path 128 is described herein as being "open", this condition shall include partially open and completely open to the extent not contradictory to the remainder of the description.

The thermostatic device 100 can further include a temperature responsive element 130. In a manner to be discussed more fully below, the temperature responsive element 130 is operative for moving the moveable element 126 relative to the fixed element 124 in response to a change in temperature of the coolant. Briefly, when the temperature of the coolant exceeds a predetermined temperature, the temperature responsive element 130 begins to move the moveable element 126 relative to the fixed element 124 from the first position to the second position. The temperature responsive element may be a bi-metal element 130.

One or both of the fixed and moveable elements 124 and 126 may be disks. In the exemplary illustration of FIGS. 1-4, both the fixed and moveable elements 124 and 126 are disks. The fixed disk 124 may be positioned proximate the moveable disk 126 and may rotate relative to the fixed disk 124 about an axis X.

As shown most clearly in the cross-sectional view of FIG. 3, the fixed disk 124 may include one or more apertures 132. The moveable disk 126 may similarly include one or more apertures 134. A shaft 134 may extend along the rotational axis X of the moveable disk 126 and extend through the fixed and moveable disks 124 and 126. The shaft 134 may be located relative to fixed disk 124 by a bushing 136.

The moveable disk 126 may be rotated by rotation of the shaft 134. The shaft 134 may include a non-circular portion 138 passing through a similarly shaped aperture 140 in the moveable disk 126. The non-circular portion 138 and the aperture 140 may be square, for example, to facilitate the transfer of torque from the shaft 134 to the moveable disk 126.

The bi-metal element 130 may be in the shape of a coil or spiral. The shaft 134 may include a slot 142 to accept an inside leg 144 of the bi-metal coil 130. An extension 146 of the shaft 134 may be pressed closed, as shown, to locate bi-metal coil 130. The bi-metal coil 130 may be restrained relative to fixed disk 124 by pin 147 and pin 148 (as shown in FIG. 4). A wavy spring 150 may be mounted to a retainer 152. Axial positioning of the retainer 152 to provide proper force against the moveable disk 126 may be achieved by a self-locking nut 154. If coolant pressure exceeds a specified level, the pressure will be relieved by the compression of the wavy spring 150 since this allows the moveable disk 126 to separate from the fixed disk 124 until restrained by the retainer 152.

With particular reference to the plan view of FIG. 3 and the schematic view of FIG. 4A, the operation of the thermostatic device 100 will be described. When the coolant temperature is lower than a predetermined temperature, the moveable disk 126 is restrained from further movement by a surface 160 of the moveable disk 126 and a pin 166 extending from the fixed disk 124. In this condition, coolant fluid is not routed to the radiator 103. In one application, the predetermined temperature may be approximately 70 degrees Fahrenheit. The bi-metal coil 130 rotates shaft 134 and thus moveable disk 126 in the direction of arrow 162 when coolant temperature exceeds the predetermined temperature. Thus, when the coolant temperature exceeds the predetermined temperature, coolant fluid is delivered to the radiator 103.

The angle between the fixed disk apertures 132 and the moveable disk apertures 134 is shown as angle 164. Angle 170 is defined as the rotational distance from the pin extension 166 to a surface 168 of the moveable disk 126. The angles 164 and 170 may be equal so when pin extension 166 contacts the surface 168, apertures 132 and 134 are aligned and full coolant flow is allowed with minimum pressure drop. The apertures 132 and 134 may remain aligned even though coolant temperature rises above the predetermined temperature at which full alignment is achieved. The predetermined temperature at which the coolant flow may be modified or be adjusted by changing the angle 170. Consequently, the angle 164 changes the temperature at which full alignment is achieved. If one or more of the apertures in the moveable disk 126 is made wider than the others, multi-stage opening of the apertures 132 and 134 may be achieved. In some applications, such an arrangement may enhance engine performance.

Figure 5:
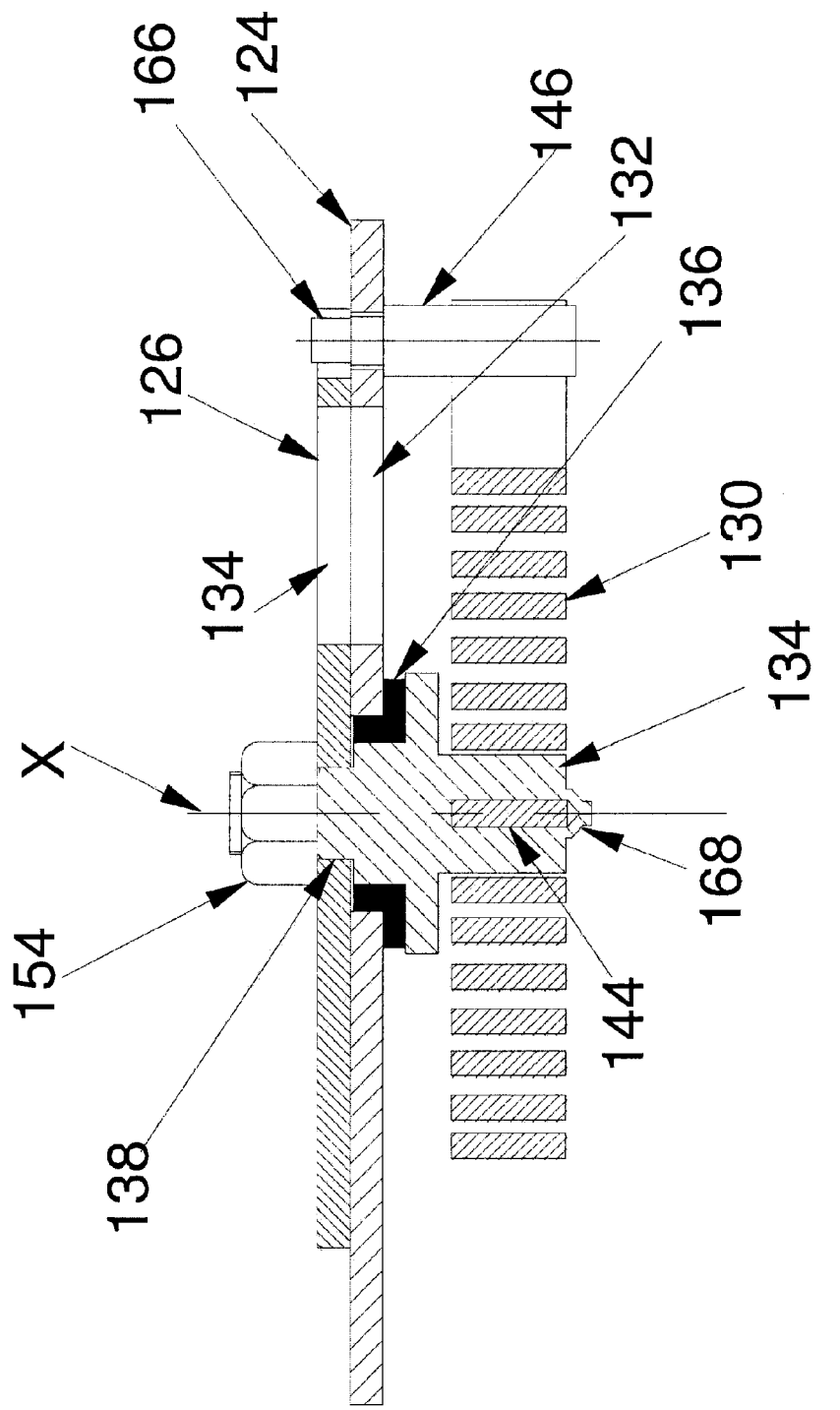
FIG. 5 is a cross-sectional view similar to FIG. 2, illustrating a variation of the thermostatic device of FIG. 1.
Figure 6:
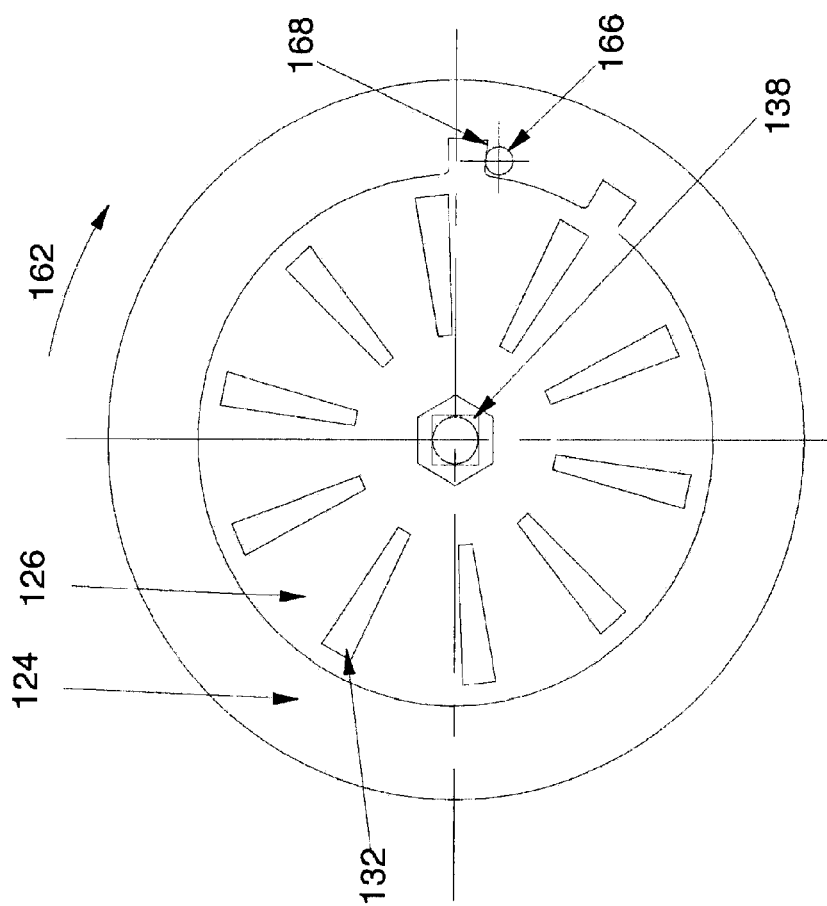
FIG. 6 is a plan view similar to FIG. 3, illustrating the variation of FIG. 5 and shown when the coolant is at operating temperature.

With reference to FIGS. 5 and 6, a variation of the embodiment shown in FIGS. 1 through 4 is illustrated. In this variation of the present disclosure, the wavy washer 150 and retainer 152 (shown in FIG. 2, for example) are eliminated. The self-locking nut 154 may be tightened using a precision torque device to assure that the fixed disk 124 and the moveable disk 126 remain in intimate contact but are still free to rotate relative to each other. All other elements remain the same as in the previously described embodiment of FIGS. 1 through 4. For this reason, like reference characters have been used to identify substantially similar elements. In FIGS. 5 and 6 the apertures 132 and 134 of the disks 124 and 126 are in alignment. FIG. 6 shows surface 168 of disk 126 stopping further rotation of the disk 126 after aperture alignment is achieved.

Figure 7:
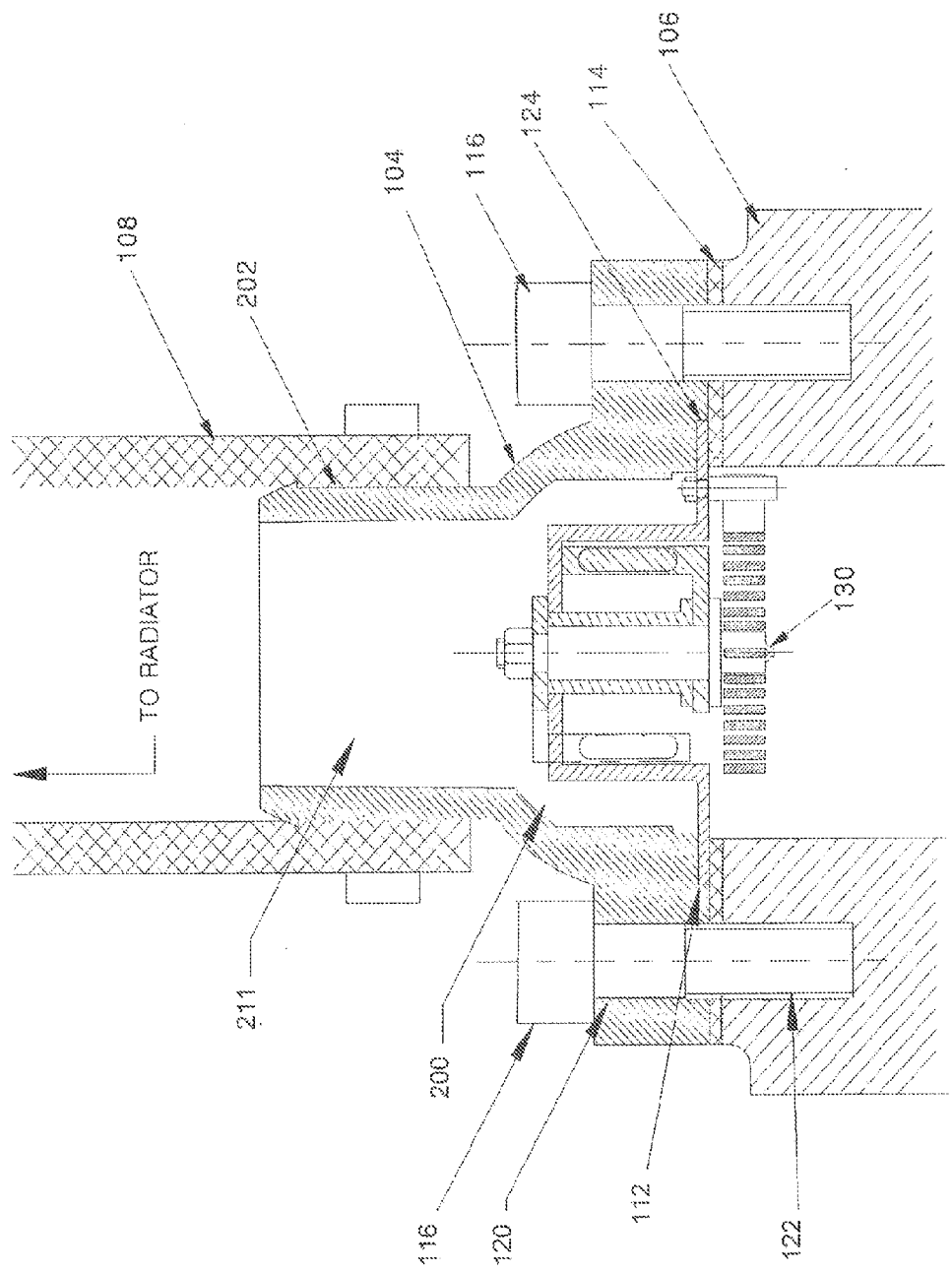
FIG. 7 is a cross-sectional view illustrating a thermostatic device in accordance with the present teachings, the thermostatic device shown operatively mounted to an engine.
Figure 10:
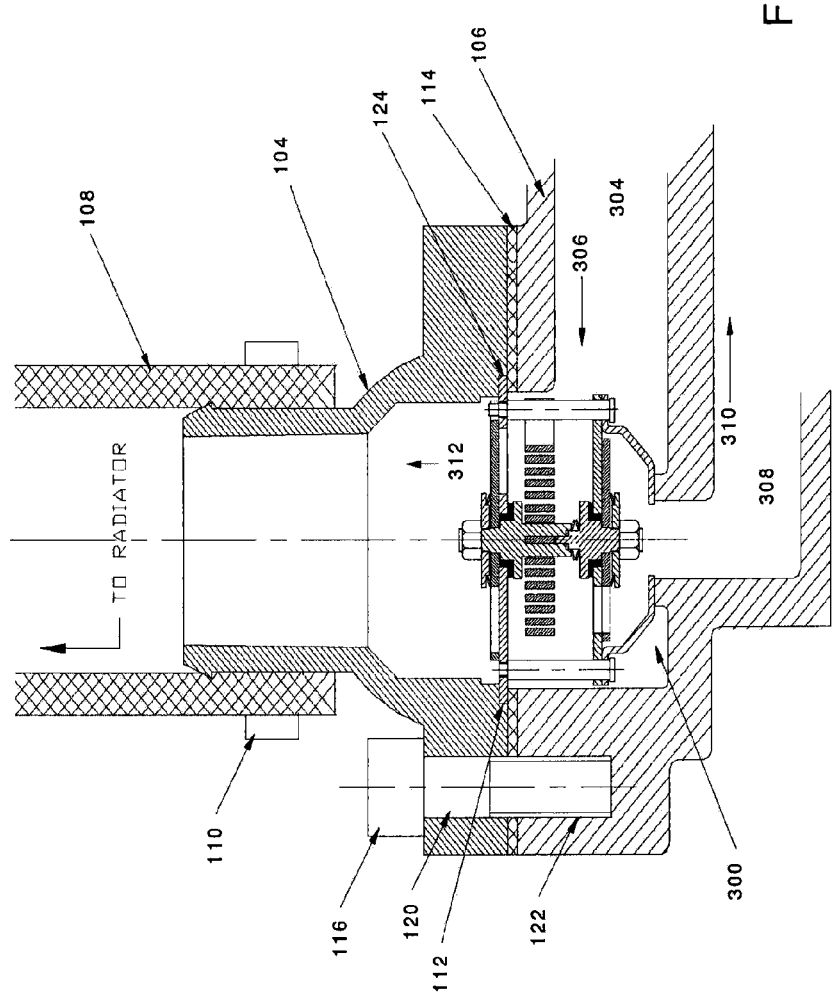
FIG. 10 is a cross-sectional view illustrating a thermostatic device in accordance with the present teachings, the thermostatic device shown operatively mounted to an engine.

Turning to FIGS. 7 through 9, another aspect of a thermostatic device constructed in accordance with the present teachings is illustrated and identified at reference character 200. As with the device 100 described above with respect to FIGS. 1 through 4, the thermostatic device 200 is shown incorporated into an assembly 202 including a housing 104. The housing 104 is positioned between an engine 106 and a hose 108 in a manner similar to that described above. Similar elements between the device 100 and the device 200 have been identified with like reference characters. These similar elements need not be described again.

The thermostatic device 200 generally includes a fixed element 204 and at least one moveable element 206. In the embodiment illustrated, the fixed element may be an element device or housing 204 and the at least one moveable element may include an internal rotor 206 and an external rotor 207. The housing 204 may incorporate a flange 208 that properly locates the thermostatic device 200 relative to the housing 104. The housing 204 may generally define an internal cavity 210 that is open to the engine 106. The opposite side of the housing 204 may be open to the radiator.

The internal rotor 206 is disposed on a first side or inner side of the housing 204 and may include a pair of blades for selectively opening and closing a pair of apertures 212. The external rotor 207 is disposed on a second side or outer side of the housing 204 and may include a pair of blades for selectively opening and closing a pair of apertures 212. The rotors 206 and 207 may include a greater or lesser number of blades.

A fluid path 211 passes through the housing 204. The fluid path 211 extends between the engine 106 and the radiator for transferring a source of coolant. The fluid path 211 may be opened and closed in response to movement of the rotors 206 and 207 relative to the housing 204. In this regard, when the rotors 206 and 207 are in first positions relative to the housing 204, the fluid path 211 is closed. When the rotors 206 and 207 are in second positions relative to the housing 204, the fluid path 211 is open. Again, it will be understood that when the fluid path 211 is described herein as being "open", this condition shall include partially open and completely open to the extent not contradictory to the remainder of the description.

The thermostatic device 200 is illustrated to further include a temperature responsive element 130. The temperature responsive element 130 is operative for moving the rotors 206 and 207 relative to the housing 204 in response to a change in temperature of the coolant. Briefly, when the temperature of the coolant exceeds a predetermined temperature, the temperature responsive element 130 begins to move the rotors 206 and 207 relative to the housing 204 from the first position to the second position. The temperature responsive element may be a bi-metal element 130.

The housing 204 may define one or more apertures 212. In the exemplary illustration of FIG. 9, the housing 204 defines four apertures 212. It will be appreciated that a greater or lesser number of apertures 212 may be incorporated within the scope of the present teachings. As will be more fully appreciated below, it may be advantageous to incorporate an equal number of apertures 212. The external rotor 207 and the internal rotor 206 may be attached to a shaft 214. In the manner discussed above with respect to the thermostatic device 100, the rotors 206 and 207 may be attached to square portions 213 of this shaft 214 to facilitate the transfer or torque. A spacer 216 may provides the correct spacing between the external rotor 207 and internal rotor 206.

The temperature responsive element may be a bi-metal spiral 130. The bi-metal element 130 may be attached to the shaft 214 by a slot 131 whose end is closed after insertion of an end of the element 130. The outer diameter of the bi-metal element 130 may be positioned by a pin 218 that is secured to the flange 208 of the housing 204. The location of the pin 218 is such that rotors 206 and 207 keep apertures 212 closed when the engine coolant is below the predetermined specified temperature and the coolant does not circulate through the radiator. Above this specified temperature, the bi-metal spiral 130 causes the shaft 214 and rotors 206 and 207 to rotate in the direction of arrow 220. The engine coolant now flows through the radiator for cooling before returning to engine 106.

In certain applications, it may be desired to eliminate one of the rotors 206 or 207. For example, the external rotor 207 and corresponding apertures 212 of the housing 204 may be eliminated. In such an alternative construction, the bi-metal spiral 130 may be large enough and heavy enough to open the apertures 112 at the correct temperature. With rotor 206 closing apertures 212, coolant pressure inside the housing 204 is higher than outside housing 204. When the apertures 212 are made sufficiently large for low pressure drop of the coolant as it passes through the thermostatic device 200, coolant pressure in cavity 210 may force the rotor 206 against the metal surrounding apertures 212 with enough force that high torque from the bi-metal spiral 130 is required to open apertures 212.

The requirement, however, for high torque from bi-metal spiral 130 may be eliminated according to the present teachings. The pressure in cavity 210 when coolant is below a specified temperature and acting upon the rotor 206 urges rotor 206, shaft 214 and rotor 207 in a rotary direction opposite to arrow 220. This pressure in the cavity 210 acting upon the rotor 207 urges the rotor 207, shaft 214 and rotor 206 in a rotary direction as shown by arrow 220. When the apertures 212 are the same size, the force in the rotary direction shown by arrow 220 is canceled by the force in the rotary direction opposite to direction shown by arrow 220. The present teachings provide pressure balance and thus very little effort (i.e., torque) is required by the temperature responsive element 130 for correct operation. The present teachings can significantly reduce the size of bi-metal spiral 130 required, and can double the total aperture area through which coolant can flow reducing the pressure drop of the coolant as it passes through the thermostatic device 200.

Turning to FIGS. 10 through 14 and 14A, another aspect of a thermostatic device in accordance with the present teachings is illustrated and identified at reference character 300. The thermostatic device 300 will be understood to integrally include a bypass for bypassing the radiator and directing coolant fluid back to the engine 106. As with the device 100 described above with respect to FIGS. 1 through 4, the thermostatic device 300 is shown incorporated into an assembly 302 including a housing 104. The housing 104 is positioned between an engine 106 and a hose 108 in a manner similar to that described above. Similar elements between the first and second embodiments have been identified with like reference characters. These similar elements need not be described again.

A channel 304 defined by the engine 106 brings coolant from a coolant pump 101 (see FIG. 14A) to the thermostatic device 300 with the direction of flow shown by arrow 306. The bypass thermostatic device 300 of the present disclosure either directs this flow back to engine 106 through a channel 308 and in the direction of arrow 310, or to a radiator 103 with the direction of coolant flow shown by arrow 312.

Figure 11:
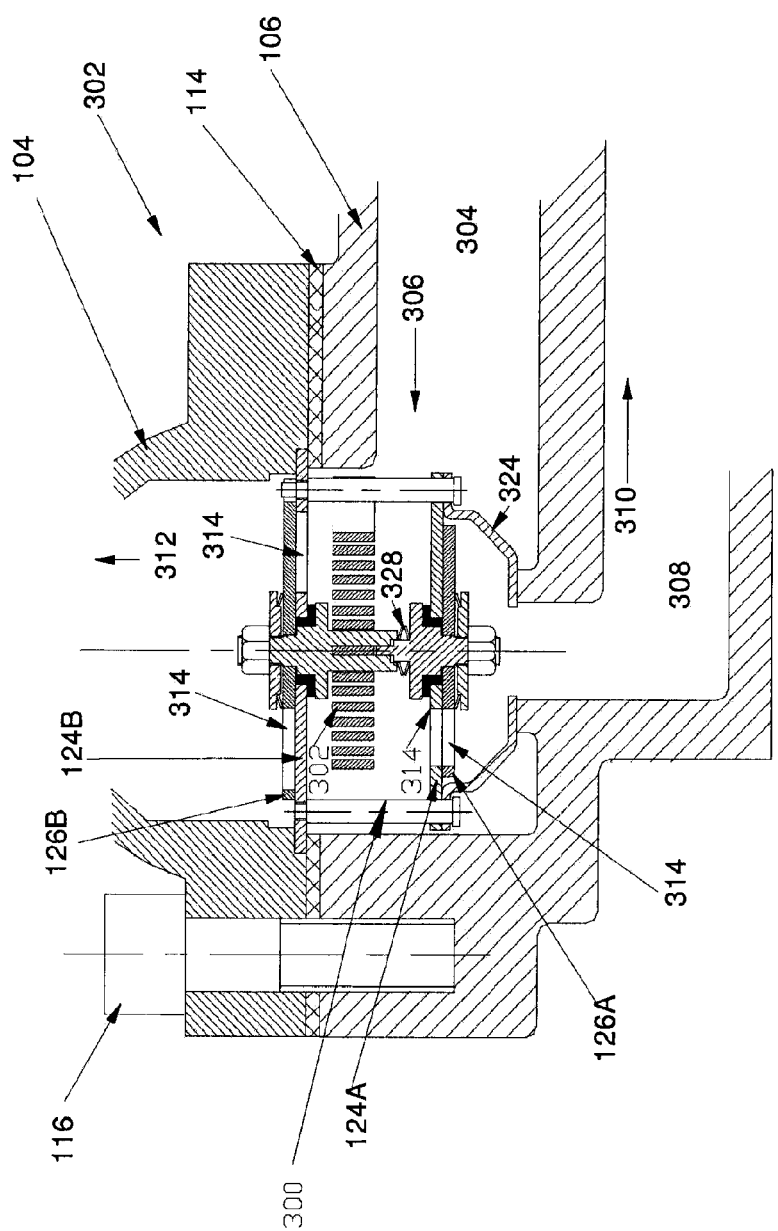
FIG. 11 is an enlarged cross-sectional view further illustrating the arrangement of FIG. 10, the thermostatic device illustrated with the coolant flow bypassed to the engine.

The cross-sectional view of FIG. 11 illustrates the thermostatic device 300 in a bypass mode. The device 300 may include two fixed disks 124A and 124B and two moveable disks 126A and 126B. The fixed disks 124A and 124B have multiple radial apertures 314. Similarly, the moveable disks 126A and 126B have multiple radial apertures 314. Radial apertures 314 in disk 124A are selectively blocked by moveable disk 126A. Radial apertures 314 in stationary disk 124A and moveable disk 126A are aligned so coolant flow from channel 304 may pass through the thermostatic device to the channel 308 back to coolant pump located on the engine 106. The thermostatic device 300 will remain in this mode until the coolant temperature reaches the predetermined temperature (e.g., 70 degrees F.) at which temperature it will change to the cooling mode as shown in FIG. 12.

The fixed and moveable elements 124A and 126A define a first pair of cooperating elements for selectively establishing the fluid path 128. The fixed and moveable elements 124B and 126B define a second pair of cooperating elements for selectively establishing a second fluid path through channel 308. The second fluid path is a bypass for routing coolant fluid back to the engine 106 without going through the radiator.

Figure 12:
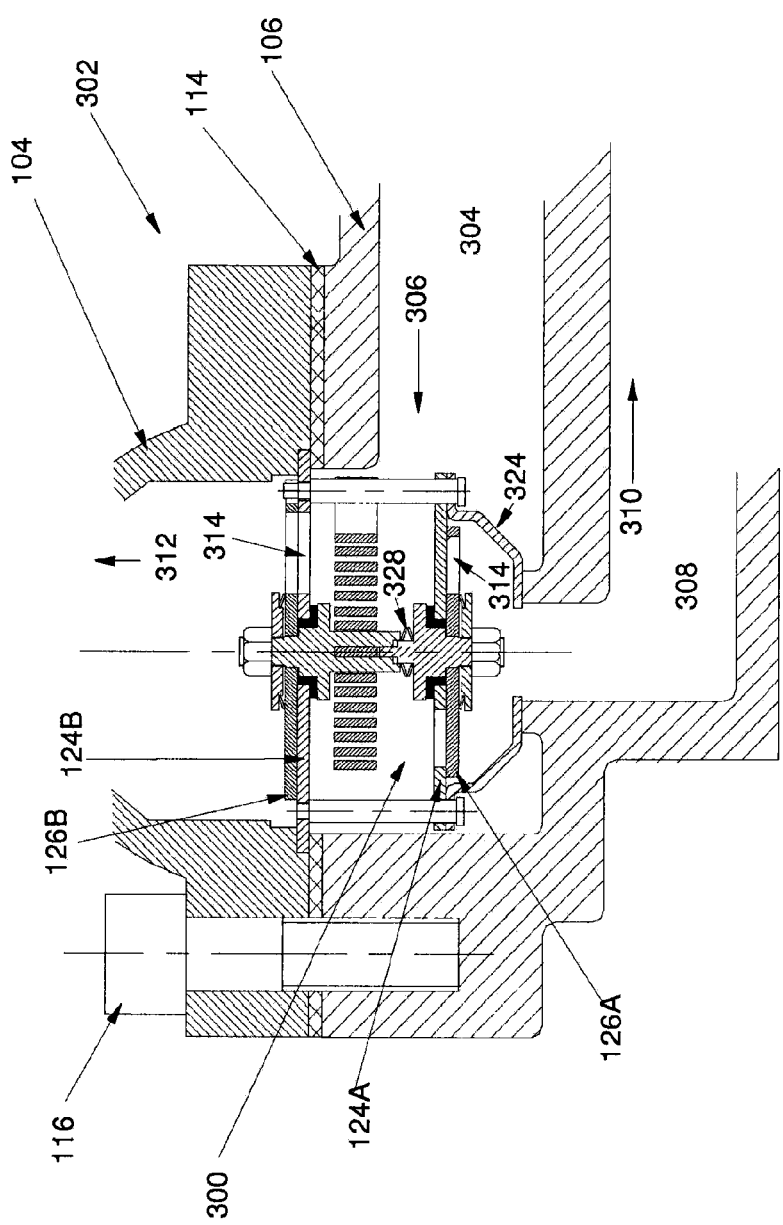
FIG. 12 is a cross-sectional view similar to FIG. 11, the thermostatic device illustrated with the with coolant flow directed to a radiator for cooling.
Figure 15:
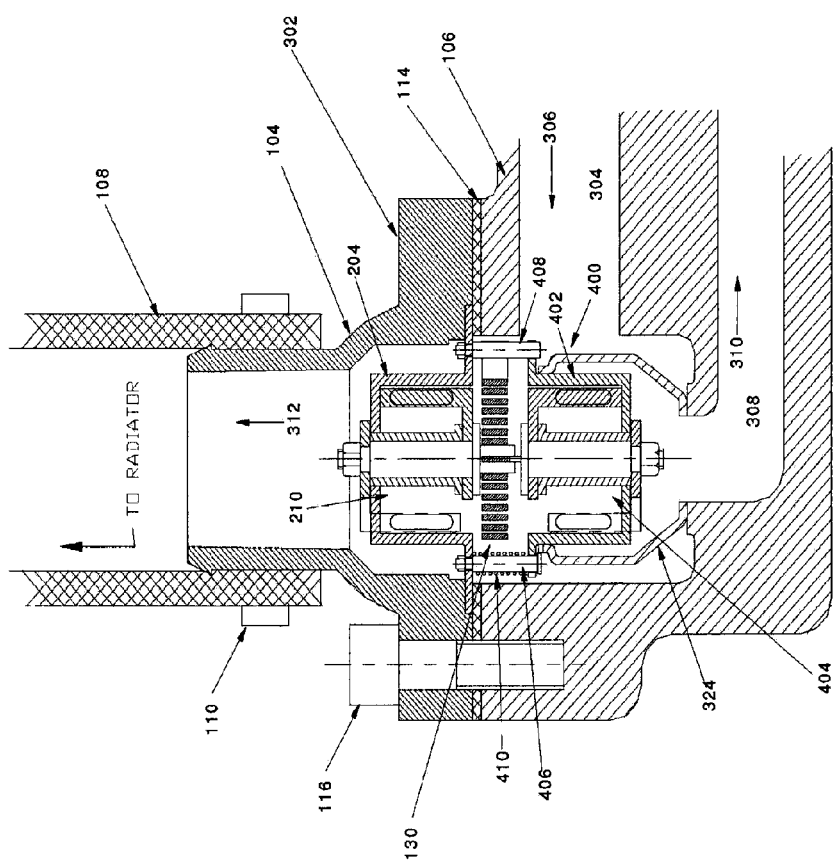
FIG. 15 is a cross-sectional view illustrating a thermostatic device in accordance with the present teachings, the thermostatic device shown operatively mounted to an engine.
Figure 16:
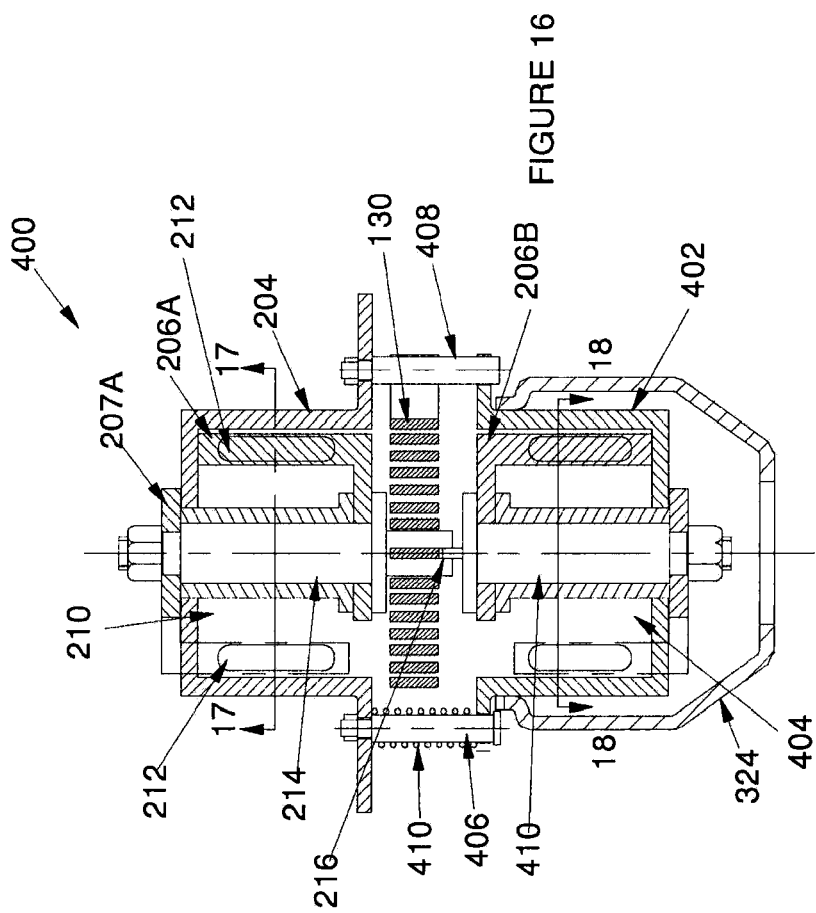
FIG. 16 is an enlarged cross-sectional view further illustrating the thermostatic device of FIG. 15.

With reference to FIG. 12, the thermostatic device 300 is illustrated in the cooling mode. Radial apertures 314 in stationary disk 124A are blocked by the position of moveable disk 126A. Radial apertures 314 in stationary disk 124B and moveable disk 126B are in alignment. This is the relative angular position of the disks after coolant temperature has reached the predetermined temperature. If one or more of the apertures 314 in moveable disk 126B are made wider than the others, multi-stage opening of the apertures is achieved. In some case this could enhance engine performance.

Stationary disks 124A and 124B may be held in proper position relative to each other by pins 320 and 322. A bypass cup 324 may be secured to the stationary disk 124A in a leak proof manner. A shaft 326, the stationary disk 124A and the bypass cup 324 are biased toward the inlet of bypass channel in the engine 106 by dished springs 328. This biasing or urging prevents coolant from entering the bypass channel unless the radial apertures 314 in disks 124A and 126A are in alignment.

A bi-metal spiral 130 is secured to the shaft 134 through a slot 142. The outer tang of the bi-metal spiral 130 is kept in proper radial alignment by pins 322 and 330, as shown in FIG. 14. The slot 142 also accepts an extension of the shaft 326 so that both shafts 134 and 326 rotate in unison by action from the bi-metal spiral 130 in response to changing coolant temperature. Shafts 134 and 326 may have portions with square cross sections where they mate with moveable disks 126A and 126B, respectively. The square cross-sections are positioned relative to slot 142 so the apertures 314 in stationary disk 124B are aligned when the apertures 314 in stationary disk 124A are blocked and vice-versa. The rotary travel of moveable disks 126A and 126B may be controlled by extension 334 of pin 322 and its abutment against precision located surfaces of disk 124B.

Other dished springs 150 may be incorporated into both sections of thermostatic device 300 to apply a calibrated force to moveable disks 126A and 126B. This force eliminates leakage between the moveable disks 126A and 126B and stationary disks 124A and 124B unless coolant pressure exceeds a specified level. Excess pressure will then be relieved by the action of these springs 150.

Turning to FIGS. 15 through 18, another aspect of a thermostatic device constructed in accordance the present teachings is illustrated and identified at reference character 400. The thermostatic device 400 effectively combines the teachings of the device 100 and the device 300 described above. In this regard, the thermostatic device 400 incorporates a rotor type arrangement similar to the device 200 and the bypass feature of the device 300. Similar elements between the previously described embodiments and the fourth embodiment have been identified with like reference characters. These similar elements need not be described again.

The thermostatic device 400 differs from the device 200 by incorporating a bypass. A channel 304 defined by the engine 106 brings coolant from a coolant pump to the thermostatic device 300 with the direction of flow shown by arrow 306. The bypass thermostatic device 400 of the present disclosure either directs this flow back to engine 106 through a channel 308 and in the direction of arrow 310, or to a radiator with the direction of coolant flow shown by arrow 312.

In addition to the housing 204 of the second embodiment, the thermostatic device 400 additionally includes a second housing 402. The housing 204 separates the coolant from coolant pump in channel 304 and cavity 210 from coolant that passes through the hose 108 on the way to the radiator. The housing 204 in conjunction with the housing 402 separates the coolant from coolant pump in the channel 304 and a cavity 404 defined by the housing 402 from the coolant that is directed back to the engine 106 through the channel 308. The housing 402 is located radially in relation to housing 204 by pins 406 and 408. Compression springs 410 may urge housing 402 against a port leading to the channel 308, thus keeping coolant from the channel 308 unless apertures in housing 402 are open.

The thermostatic device 400 includes inner and outer rotors 206A and 207A similar in construction and operation to inner and outer rotors 206 and 207 of the device 200. The inner and outer rotors 206A and 207A are associated with the housing 204 in the manner discussed above for selectively opening and closing the apertures 212 defined by the housing. The thermostatic device 400 additionally includes similarly constructed inner and outer rotors 206B and 207B associated with the housing 402 for selectively opening and closing the apertures 212 of the housing 402.

The shaft 214 rotates in response to the action of the bi-metal spiral 130 as it responds to changes in the temperature of the coolant. A slot 216 in the shaft 214 connects with the inside end of the bi-metal spiral 130. The spiral 130 is anchored at it outer projection by the pin 408 and an adjacent pin (not shown). The slot 216 in the shaft 214 accepts a tab extension of a second shaft 410.

Figure 17:
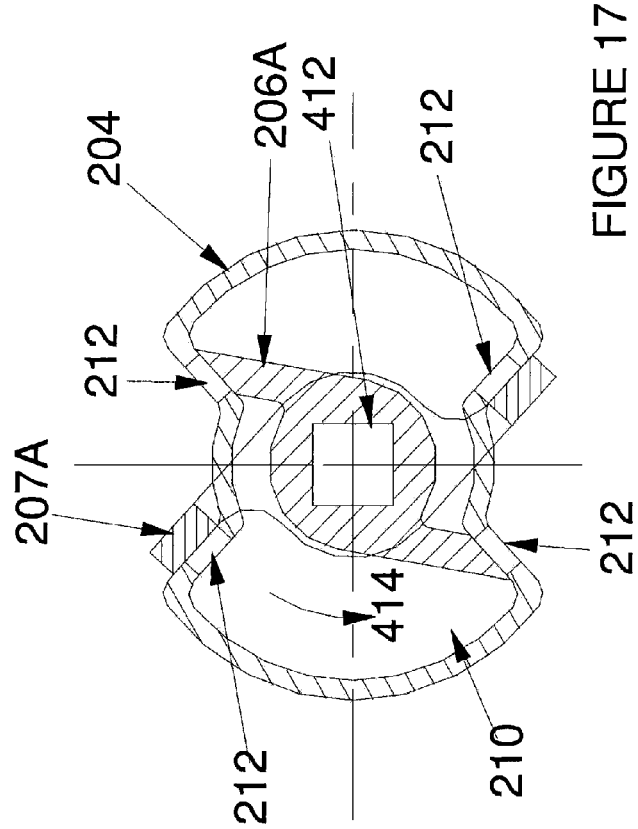
FIG. 17 is a cross-section taken along the line 17-17 of FIG. 16.

FIG. 17 is a cross-sectional view through the portion of thermostatic device 400 that controls flow to the radiator. The shaft 214 may include square cross-section portions 412 that drive rotors 206A and 206B. These rotors cover the apertures 212 of the housing 204 when coolant temperature is less than the predetermined temperatures (e.g., 70 degrees F., for example) and coolant flow are blocked from going to the radiator. The cavity 210 is in direct contact with the coolant flow from the coolant pump.

In FIG. 17, the bi-metal spiral 130 has rotated shaft 210 in the direction of arrow 414. The rotor 206A covers the apertures 212 from inside of the housing 204. The pressure in cavity 210 applies a rotary force to rotor 206A that may make it difficult to open apertures 212 unless a balancing force is present. This balancing force is present by the action of rotor 207A. Rotor 207A is mounted outside the housing 204 and thus the pressure in cavity 210 wants to open apertures 212. By properly sizing apertures 212 selectively closed by the rotor 207A in relation to the apertures 212 selectively closed by the rotor 206A, a small but positive force is applied to rotors rotor 206A and 207A so a positive seal of the apertures is achieved.

Figure 18:
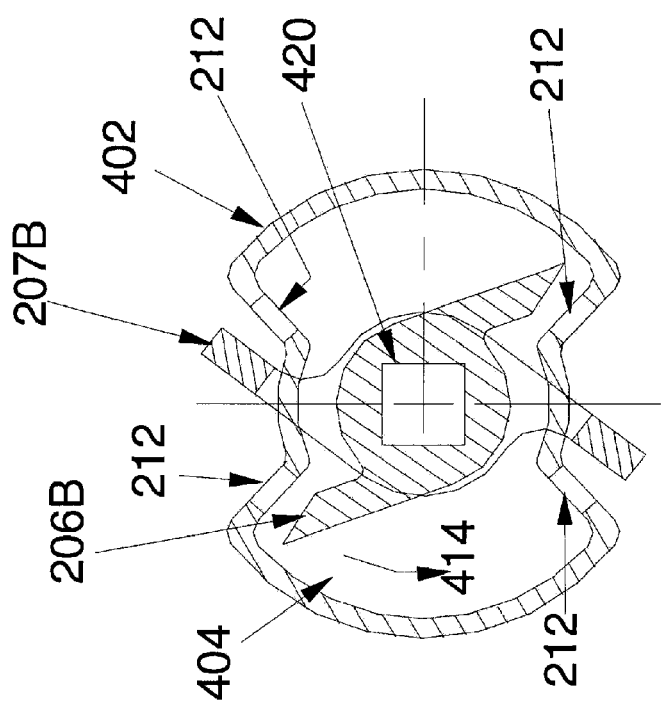
FIG. 18 is a cross-section taken along the line 18-18 of FIG. 2D.

FIG. 18 is a cross-sectional view through the portion of thermostatic device 400 that controls the bypass flow to the engine 106. The shaft 410 may have square cross-section portions 420 that drive rotors 206B and 207B. These rotors 206B and 207B are positioned so the apertures 212 are open when coolant temperature is less than the predetermined temperatures (e.g., 70 degrees F.) and coolant flow is directed back to the engine 106.

When the coolant temperature is higher than the predetermined temperature, the bi-metal spiral 130 rotates shafts 214 and 410 in a direction opposite to arrow 414. When this occurs, the apertures in housing 204 are opened and the apertures in housing 402 are closed thus directing coolant flow to the radiator. The same pressure-balancing effect is operative with the closing of the apertures 212 as previously described above.

The thermostatic device 400 is thus pressure balanced in both the bypass mode and the radiator-cooling mode. The present teachings may not only dramatically reduce the size of bi-metal spiral, but may also doubles the total aperture area through which coolant can flow in both operating modes.

It should now be appreciated that the various present teachings provide a thermostatic device that eliminates the wax element failure mode that may be advantageous for certain applications. It will be noted, however, that certain present teachings may also be utilized with wax driven elements.

The various present teachings additionally provide a thermostatic device that is rugged and more reliable than conventional thermostats, and a multiple-stage opening to enhance engine and/or transmission performance. The various teaching of the present teachings further provide a thermostatic device that is significantly less expensive to produce than conventional thermostats, and a bypass style thermostatic device that eliminates the wax element failure mode.

The foregoing discussion discloses and describes merely exemplary arrangements of the present teachings. One skilled in the art will readily recognize from such discussion, and from the accompanying drawings and claims, that various changes, modifications and variations can be made therein without departing from the spirit and scope of the teachings as defined in the following claims.

What is claimed is:

1. A thermostatic assembly for controlling flow of a fluid along a fluid path in response to a temperature of the fluid, the thermostatic assembly comprising:

a structure for location in the fluid path, the structure including a plurality of openings for selectively allowing the fluid to pass through the structure; and first and second moveable elements each coupled to the structure for movement between a first position and a second position such that in the first position the plurality of openings permit the fluid to pass through the structure and in the second position the first and second moveable elements reduce or prevent the fluid from passing through the structure, wherein the first and second moveable elements each selectively opens and closes at least two openings of the plurality of openings such that a first force in a first direction to move the first moveable element toward the first position is cancelled by a second force in a second, opposite direction to move the second moveable element toward the second position.

2. The thermostatic assembly of claim 1, further comprising a temperature responsive element coupled to the first and second moveable elements for moving the first and second moveable elements between the first position and the second position.

3. The thermostatic assembly of claim 2, wherein the temperature responsive element is a bi-metal element.

4. The thermostatic assembly of claim 3, further comprising a shaft that connects the first and second moveable elements to the bi-metal element to transmit movement of the bi-metal element to the first and second moveable elements.

5. The thermostatic assembly of claim 3, wherein the bi-metal element rotates the first moveable element in a first direction in response to a temperature above a predetermined temperature and in a second, opposite direction in response to a temperature below the predetermined temperature.

6. The thermostatic assembly of claim 2, wherein the temperature responsive element moves the first moveable element in one direction on rising temperature of an engine coolant and the opposite direction with falling temperature.

7. The thermostatic assembly of claim 2, wherein a first half of the openings of the structure are sealed from a first side of the structure and a second half of the openings of the structure are sealed from a second side of the structure by action of the temperature responsive element.

8. The thermostatic assembly of claim 1, wherein the fluid path is partially open at a first temperature and fully open at a second temperature.

9. A thermostatic assembly for controlling flow of a fluid along a fluid path in response to a temperature of the fluid, the thermostatic assembly comprising:
a housing for location in the fluid path, the housing including a plurality of openings including at least first and second pairs of openings for selectively allowing the fluid to pass through the housing; and
first and second rotors each coupled to the housing for movement between a first position and a second position such that in the first position the plurality of openings permit the fluid to pass through the housing and in the second position the first and second rotors reduce or prevent the fluid from passing through the housing,
wherein the first and second rotors each selectively opens and closes at least two openings of the plurality of openings such that a first force in a first direction to move that the first rotor toward the first position is cancelled by a second force in a second, opposite direction to move the second rotor toward the second position.

10. The thermostatic assembly of claim 9, further comprising a temperature responsive element coupled to the first and second rotors for moving the first and second rotors between the first position and the second position.

11. The thermostatic assembly of claim 10, wherein the temperature responsive element is a bi-metal element.

12. The thermostatic assembly of claim 9, wherein the first and second rotors both operate to open and close one of the first and second pairs of openings.

13. The thermostatic assembly of claim 9, wherein a first half of the openings of the housing are sealed from an outside of the housing and a second half of the openings of the rotor are sealed from an inside of the housing.

* * * * *